United States Patent [19]
Nilles

[11] 3,807,989
[45] Apr. 30, 1974

[54] REFINING HEMATITE PIG IRON

[75] Inventor: Paul Emile Nilles, Embourg, Belgium

[73] Assignee: Centre de Recherches Metallurgiques, Brussels, Belgium

[22] Filed: Apr. 4, 1972

[21] Appl. No.: 240,807

[30] Foreign Application Priority Data
Apr. 7, 1971 Belgium ............................. 62943

[52] U.S. Cl. ..................................... 75/60, 75/52
[51] Int. Cl. ............................................. C21c 5/34
[58] Field of Search ...................... 75/60, 52–59, 75/34

[56] References Cited
UNITED STATES PATENTS

| | | | |
|---|---|---|---|
| 2,864,689 | 12/1958 | Perrin .................................... | 75/59 |
| 2,937,084 | 5/1960 | Klepp..................................... | 75/52 |
| 3,666,445 | 5/1972 | Stone..................................... | 75/53 |
| 2,562,813 | 7/1951 | Ogorzaly............................... | 75/34 |
| 1,145,506 | 7/1915 | Pasquier ............................... | 75/52 |
| 3,076,703 | 2/1963 | Metz...................................... | 75/52 |

*Primary Examiner*—Hyland Bizot
*Assistant Examiner*—Peter D. Rosenberg
*Attorney, Agent, or Firm*—Lawrence I. Field

[57] ABSTRACT

A process for refining hematite pig iron in a convertor by blowing oxygen into a bath of molten hematite pig iron through the bottom and/or through the side wall of the vessel, below the top surface of the bath, and in which a quantity of pieces of lime, at most 10 percent of the pieces of lime averaging less than 2 mm in particle size, is introduced into the bath through the mouth of the convertor, the quantity being sufficient to give a slag with a $CaO/SiO_2$ between 2.5 and 5; the total quantity of pig iron and scrap, and iron in the form of ore (if any), charged into the convertor is such that the specific volume of the convertor exceeds 0.85 $m^3$/ton.

By hematite pig iron, is meant a low phosphorus pig iron. With a process in which oxygen is injected through the bottom, the refining of high phosphorus pig iron does not give problems to the steelmaker; only for hematite pig iron, it was necessary to find a way of preventing severe ejections of steel and slag out of the converter.

5 Claims, No Drawings

REFINING HEMATITE PIG IRON

The present invention relates to processes for refining hematite pig iron in a bottom blown converter, the refining gases consisting of commercially pure oxygen being blown into the bath of pig iron through the bottom of the converter or through the part of the side wall situated below the bath surface.

It is well known that if it is wished to refine a hematite pig iron by means of an oxidizing gas, the problem of controlling the correct evolution of the entire refining operation is the more difficult to resolve satisfactorily, the richer the oxidizing gas is in oxygen. One reason is that the local speed of particular reactions and the temperature generated at particular points in the bath, are in direct proportion to this oxygen content.

It is equally known that the correct evolution of a hematite pig iron refining operation, especially in the case of refining by means of pure oxygen, is linked to a very definite evolution of the slag composition in the course of time. The composition of the slag thus has a considerable influence on its participation in the decarburizing reaction and, consequently, on the evolution of this reaction.

It is also known that the eruption of sparks and the spillage of slag which occur when lime is added in pieces to the metal bath through the mouth of conventional converters (pieces of sufficient size to reach the bath without the risk of being carried away by the converter gases) are clearly deleterious to the safety of the workers and to the iron output of the refining operation; these eruptions and slag spillages may be slowed down and reduced, by appropriate evolution of the slag during this operation; in particular, the viscosity of the slag influences its susceptibility to foaming and spillage. The importance of an effective method of governing and controlling this evolution can thus be seen immediately.

When it is intended to perform a hematite pig iron refining operation by bottom blowing, it should be kept in mind that a single operational variable only is available for control. The reason for this is simple: the oxygen blown in penetrates directly into the bath before passing partially into the slag. There is thus no possibility of transferring a given proportion of the oxygen to the slag at will, in order to regulate its formation. The sole operational parameter available is the rate of flow of the oxygen blown in from below, and this can have only a very limited effect on the distribution of the oxygen between the bath and the slag. The natural consequence of this situation is that the observed evolution in the composition of the slag must be accepted, instead of being controllable, which represents a substantial disadvantage. In particular, the absence of FeO from the slag is at the root of the difficulties in dissolving lime in this slag.

Various attempts have already been made to eliminate this disadvantage, by seeking to make use of another operational variable. In particular, it has already been suggested that finely divided lime be placed in suspension in the refining gas blown into the bath through the bottom of the converter; signs of considerable attrition were then observed in the tuyeres; moreover, serious difficulties were caused by the conveying of the powder and by its distribution between the tuyeres.

The addition of lime in powder form through the top of a converter during the blow has always been considered to be inefficient, because lime in powder form was carried off from the converter by the converter gases before it could reach the bath. This method of operation could not be successful except by propelling the lime particles at high speed, as in the LD-AC process.

Contrary to the suppositions which are currently considered as established facts, the Applicant has found that, in remarkable and quite unexpected manner, if the refining operation is performed by bottom blowing of commercially pure oxygen, one can rapidly obtain a slag which is quite fluid and reactive and does not give rise to any splashing or spillage, by introducing through the mouth of the converter before the start of the blowing operation or soon after the start (preferably before the start) a quantity of lime of predetermined granulometry provided the quantity of steel produced in the converter is taken into account. Owing to this unexpected finding, a particularly efficient hematite pig iron refining process can be developed.

Accordingly, the invention provides a process for refining hematite pig iron in a converter by blowing an oxidizing gas into the bath of molten metal through the bottom and/or side wall of the converter below the surface of the bath, in which process: the oxidizing gas is oxygen; the predetermined quantity of lime necessary to obtain a slag having a given basicity index $CaO/SiO_2$ (most frequently between 2.5 and 5) is introduced through the mouth of the converter, at most 10 percent of the quantity of lime being in the form of a powder whose average granulometry is less than 2 mm (preferably less than 1 mm); the total quantity of pig iron and scrap, and iron in the form of ore (if any) charged into the converter (at the beginning of and during the refining operation) is such that the specific volume of the converter exceeds 0.85 $m^3$ ton.

The specific volume of a converter for a given refining operation is the ratio between the internal volume of the converter (immediately after construction or relining) and the weight of steel tapped from the converter, and is expressed in cubic meters/ton.

The infeed of lime through the mouth of the converter is preferably performed immediately after the start of the blowing operation or, preferably before the start.

As already stated above, it has been observed that, in an unexpected and unforeseeable manner, a hematite pig iron refining operation performed in this way renders it possible to obtain a refining action unaffected by splashing or spillage, and consequently to obtain high-grade steel economically in a short time, in respect of time and economy.

The infeed of lime into the converter may be performed in a conventional manner, for example from an appropriate hopper.

EXAMPLE

A converter with a useful internal volume of 11.3 $m^3$ was charged with 8.91 tons of pig iron containing 1.25% Si, 0.78% Mn, and 4.25% C, by weight, and 3 tons of scrap. The entire quantity of lime required was then added through the mouth, that is to say, 920 kg in the form of pieces with 20/40 mm granulometry, the lime containing 5 percent of powdered lime produced by abrasion. After refining using commercially pure oxygen, 10.970 kg of steel was obtained without incurring splashing (therefore the specific volume was about 1.03m³/ton). The duration of the refining operation was 15 minutes.

The process described above may be applied advantageously by blowing the oxygen in through one or more tuyeres having two co-axial tubes, the central tube of the blast nozzle being intended to blow in the oxygen, the peripheral tube of the blast nozzles being intended for the infeed of a liquid or gaseous protective fluid.

What is claimed is:

1. A process for refining hematite pig iron by blowing an oxidizing gas into a bath of molten hematite pig iron through a wall of the convertor below the surface of the bath and by introducing a predetermined amount of lime into said convertor to form a slag with elements oxidized during the refining of said pig iron in which process:

a. the oxidizing gas is oxygen;
  b. substantially the entire predetermined quantity of lime necessary to obtain a slag having a given basicity index (ratio of CaO to $SiO_2$ by weight) is introduced through the open top of the convertor before or at the beginning of the refining operation, and not more than 10 percent by weight of the said quantity of lime being in the form of a powder whose average granulometry is less than 2 mm; and c. the total quantity of pig iron and scrap and any iron in the form of ore, charged into the convertor is such that the specific volume of the convertor exceeds 0.85 m³/ton of metal tapped.

2. A process as claimed in claim 1, in which the basicity index is between 2.5 and 5.

3. A process as claimed in claim 1, in which the lime in the form of powder has an average granulometry of less than 1 mm.

4. A process as claimed in claim 1, in which the lime is introduced at the beginning of the refining operation.

5. A process as claimed in claim 4, in which the lime is introduced before the start of blowing.

* * * * *